(12) United States Patent
Ejlersen et al.

(10) Patent No.: US 11,769,215 B2
(45) Date of Patent: Sep. 26, 2023

(54) METHOD, SYSTEM AND SOFTWARE PROGRAM FOR HANDLING AND STORING PURCHASE TRANSACTIONS BETWEEN A USER AND POINT-OF-SALES

(71) Applicants: Anders Michael Juul Ejlersen, Oxford (GB); Kristoffer Stellini Juul Ejlersen, Oxford (GB); Frederik Stellini Juul Ejlersen, Oxford (GB)

(72) Inventors: Anders Michael Juul Ejlersen, Oxford (GB); Kristoffer Stellini Juul Ejlersen, Oxford (GB); Frederik Stellini Juul Ejlersen, Oxford (GB)

(73) Assignee: Myver Holding ApS, Skamby (DK)

( * ) Notice: Subject to any disclaimer, the term of this patent is extended or adjusted under 35 U.S.C. 154(b) by 99 days.

(21) Appl. No.: 16/719,933

(22) Filed: Dec. 18, 2019

(65) Prior Publication Data

US 2020/0126163 A1 Apr. 23, 2020

Related U.S. Application Data

(62) Division of application No. 14/532,382, filed on Nov. 4, 2014, now Pat. No. 10,515,420.
(Continued)

(51) Int. Cl.
| | | |
|---|---|---|
| *G06Q 40/00* | (2023.01) | |
| *G06Q 40/12* | (2023.01) | |
| *G06Q 20/20* | (2012.01) | |
| *G06Q 30/012* | (2023.01) | |
| *G06Q 30/0251* | (2023.01) | |

(Continued)

(52) U.S. Cl.
CPC ............ *G06Q 40/12* (2013.12); *G06Q 20/20* (2013.01); *G06Q 20/209* (2013.01); *G06Q 20/326* (2020.05); *G06Q 20/34* (2013.01); *G06Q 30/012* (2013.01); *G06Q 30/0255* (2013.01); *G06Q 40/10* (2013.01)

(58) Field of Classification Search
CPC ........ G06Q 40/12; G06Q 40/10; G06Q 20/20; G06Q 20/209; G06Q 30/012; G06Q 30/0255; G06Q 20/326; G06Q 20/34
USPC ...................................................... 705/14.53
See application file for complete search history.

(56) References Cited

U.S. PATENT DOCUMENTS 11,010,753 B2 * 5/2021 Kalgi ................. G06Q 20/3226
2002/0188561 A1 12/2002 Schultz
(Continued)

FOREIGN PATENT DOCUMENTS

| | | |
|---|---|---|
| GB | 2358723 A | 8/2001 |
| WO | WO-9922327 A1 | 5/1999 |

(Continued)

*Primary Examiner* — Russell S Glass
(74) *Attorney, Agent, or Firm* — Morse, Barnes-Brown & Pendleton, P.C.; Sean D. Detweiler, Esq.

(57) ABSTRACT

A method and system for handling and storing purchase transactions between a user and point-of-sales is described. The method comprises the steps of: a user purchasing an item from a point-of-sale, the point-of-sale generating an electronic receipt related to said item, the point-of sale sending the electronic receipt to an accounting system for bookkeeping of purchase transactions, said system storing the receipt, said system extracting price and information about the item, and said system storing the price and information in a bookkeeping module.

76 Claims, 2 Drawing Sheets

Related U.S. Application Data

(60) Provisional application No. 62/065,042, filed on Oct. 17, 2014.

(51) Int. Cl.
G06Q 40/10 (2023.01)
G06Q 20/34 (2012.01)
G06Q 20/32 (2012.01)

(56) References Cited

U.S. PATENT DOCUMENTS

| | | | |
|---|---|---|---|
| 2003/0028451 A1* | 2/2003 | Ananian | G06Q 30/0615 705/26.42 |
| 2003/0115135 A1* | 6/2003 | Sarfraz | G06Q 30/06 705/39 |
| 2003/0126020 A1 | 7/2003 | Smith et al. | |
| 2004/0117301 A1* | 6/2004 | Fujisawa | G06Q 20/352 705/39 |
| 2004/0225567 A1 | 11/2004 | Mitchell et al. | |
| 2009/0024536 A1* | 1/2009 | Archer | G06Q 40/02 705/36 R |
| 2011/0034155 A1 | 2/2011 | Kamamoto | |
| 2011/0087550 A1 | 4/2011 | Fordyce, III et al. | |
| 2011/0125598 A1 | 5/2011 | Shin et al. | |
| 2012/0011071 A1 | 1/2012 | Pennock et al. | |
| 2012/0047052 A1 | 2/2012 | Patel | |
| 2012/0109693 A1 | 5/2012 | Smith | |
| 2012/0290422 A1 | 11/2012 | Bhinder | |
| 2012/0290484 A1 | 11/2012 | Maher | |
| 2013/0204727 A1 | 8/2013 | Rothschild | |
| 2014/0006198 A1 | 1/2014 | Daly et al. | |
| 2014/0040127 A1* | 2/2014 | Chatterjee | G06Q 20/322 705/41 |
| 2014/0195361 A1 | 7/2014 | Murphy et al. | |
| 2014/0229305 A1 | 8/2014 | Ellan | |
| 2014/0249970 A1 | 9/2014 | Susaki et al. | |
| 2015/0120418 A1* | 4/2015 | Cervenka | G06Q 20/20 705/14.23 |
| 2018/0053203 A1* | 2/2018 | Pomeroy | G06Q 30/0251 |

FOREIGN PATENT DOCUMENTS

| | | |
|---|---|---|
| WO | WO-0111539 A1 | 2/2001 |
| WO | WO-0114995 A2 | 3/2001 |
| WO | WO-2005091235 A1 | 9/2005 |

* cited by examiner

METHOD, SYSTEM AND SOFTWARE PROGRAM FOR HANDLING AND STORING PURCHASE TRANSACTIONS BETWEEN A USER AND POINT-OF-SALES

RELATED APPLICATIONS

This application is a division of, and claims priority to and the benefit of, co-pending U.S. patent application Ser. No. 14/532,382, filed Nov. 4, 2014, which claimed priority to U.S. Provisional Application No. 62/065,042, filed Oct. 17, 2014, all said applications are expressly and entirely incorporated herein by reference.

FIELD OF THE INVENTION

The present invention relates to a method, system, and software program for handling and storing purchase transactions between a user and point-of-sales.

BACKGROUND OF THE INVENTION

Currently a user, e.g. a private consumer or firm or other, may purchase and/or pay for an item (a physical or non-physical product or service) from a point-of-sale, said point-of-sale e.g. being a physical shop or an online shop or an account. The point-of-sale prints a physical receipt, and/or emails an electronic receipt and possible a warranty in form of a pdf-document or similar, alternatively the receipt has to be downloaded from a website.

The user following has to balance the receipt against a credit account or debit account in order to ensure that the amount is correct and also to ensure that no other amounts have erroneously been withdrawn from the account. If the user further wants the amount to appear as an entry in a private accounting or in all links and parts of a firm's bookkeeping records, the amount and possible receipt and information about the purchased item need to be manually entered into the private accounting or bookkeeping records.

Further, the receipt and warranty need to be archived either physically or electronically. If the receipt and warranty has been received in electronic form from the point-of-sale, the electronic receipt and warranty may simply be stored electronically on a computer or server, e.g. in a dedicated folder. If the receipt has been printed, the receipt needs to be scanned or photographed and subsequently stored on the computer or server.

If the user wants to receive offers and/or advertisements from the point-of-sale, and/or the point-of-sale wants to send offers and/or advertisements to the user, it is possible to sign up for a newsletter or the like. However, it is readily not possible to receive targeted offers and/or advertisements from the point-of-sale directly following the purchase or the payment.

Overall, the many steps involved in balancing accounts, storing receipts etc. are very time consuming and tedious for a private consumer and even more so subject to cost for firms that have a very large number of purchases and where the purchased items needs to be stored and categorised for accounting and tax purposes, not least when an employee are using credit or debit cards to pay for travel tickets and car hire and fuel and restaurants and hotels and more. The employee needs to keep all the receipts, and then normally on a monthly basis he or she must account for the amounts spent by balancing the monthly statement against the kept receipts. The firm must then receive and handle and post and balance all transactions and store all receipts.

SUMMARY OF THE INVENTION

It is an object of the invention to provide an alternative method and system for handling purchase transactions, which overcome or ameliorates at least one of the disadvantages of the prior art or which provide a useful alternative.

It is further an object of the invention to provide a method and system, which automatically handles storage of receipts and bookkeeping.

It is further an object of the invention to provide a method and system, which automatically handles and stores warranties of purchased items.

It is further an object of the invention to provide a platform for the point-of-sale to send offers and/or advertisements to the user, directly following the purchase or the payment.

This is according to a first aspect of the invention provided by a method for handling and storing purchase transactions between a user and point-of-sales, wherein the method comprises the steps of:

a) the user purchasing an item from a point-of-sale, b) the point-of-sale generating an electronic receipt related to said item, c) the point-of sale sending the price and information about the item, and the electronic receipt to an accounting system for bookkeeping of purchase transactions, d) said accounting system storing the receipt, e) if the price and information about the item is not sent separately under c), then extracting price and information about the item from the receipt, and f) said accounting system storing the price and information in a bookkeeping module.

Thereby, the invention provides a method, where a purchased item may automatically be entered into accounts, and where balancing of bookkeeping records and accounts is automatically carried out upon a purchase of an item, or carried out by the user immediately following the purchase of the item. Further, the receipts are automatically stored, or stored by the user immediately following the purchase of the item, whereby the user can check the receipts for possible errors.

The bookkeeping, balancing and storage may be carried out in real-time, whereby the user can instantly access his or her account to check the records.

For the point-of-sale, the method has the advantage that physical receipts do not have to be printed, and for the user, the method has the advantage that it is not necessary to receive and store physical receipts. Further, it is an advantage that the user does not have to enter purchases into accounts and balancing accounts.

The bookkeeping module preferably comprises an account associated with the user, more preferably an account associated with a user profile created by the user.

The user may be a private consumer or a firm.

In practice the method may be handled by a software program integrated on a server or cloud. The user may have a front end, e.g. in form of a software application installed on a smart device, such as a smart phone or a tablet, where the user can access the associated user profile and account. The software may also be installed on a PC or a Mac or be web-based so that the user can access the account from anywhere. The software may be based on PC, Unix, IOS, Android or any other suitable platform.

The electronic receipt and other information may be sent by email, text message, MMS, or the like.

According to a preferred embodiment, the point-of-sale further generates an electronic warranty and sends the electronic warranty to the accounting system. Thereby, the invention will also store warranties, and the user can always gain access to the warranties, if the purchased item becomes defect within the warranty period.

The electronic receipt may for instance be stored in a first module of the storage, and the electronic warranty be stored in a second module. The accounting system and bookkeeping system may be an integrated system or two separate systems.

In practice the accounting system may simply comprise an external server or cloud solution, and where the first module is a first folder on the server or cloud, and the second module is a second folder on the server or cloud.

The accounting system may for instance upload the price and information to an external bookkeeping system or Enterprise Resource Planning (ERP) system, which for instance may be any system commercially available on the market, such as but not limited to SAP and Microsoft AX.

In a highly advantageous embodiment, the accounting system further stores a date about an expiry of a warranty. The accounting system sends a warning to the user a predetermined number of days before the expiry of the warranty. Thus, the user receives a reminder of the expiry of the warranty, whereby the user is able to check the purchased item a final time for possible defects within the warranty period.

The accounting system may advantageously generate and store the date about an expiry based on national or regional laws of the location of the point-of-sale. The system or software program may continuously be updated with changes in national law so that the user at all times is ensured that the warranty laws are complied with.

According to a preferred embodiment, the method further provides a user profile for the user, wherein the user profile comprises information about the user and associated bank account and credit and debit card details. The user profile is preferably stored on the accounting system. The user profile may further be accessible from a front end, such as a PC or a smart device via a software application installed on the front end or via a web-based access.

In another preferred embodiment, accounting details related to the user profile are automatically balanced with the amount and information about the purchased item.

In a highly advantageous embodiment, the method further comprises information of a budget for said user. The budget information may be stored in the user profile and set by the user, alternative by for instance a bank, credit card provider, or debit card provider. In a particular advantageous embodiment, the accounting system generates a warning and sends this to the user, if the purchase in step a) exceeds the budget for said user.

In one embodiment, the bookkeeping module comprises a chart of accounts, and wherein the price and information are stored in said chart of accounts.

In a first embodiment, the point-of-sale provides price and information about the item and sends said price and information about the item to the accounting system, which may thus be sent separately along with the electronic receipt. In other words, the point-of-sale extracts the price and information about the purchased item and sends these to the accounting system.

In a second embodiment, the accounting system extracts the price and information from the electronic receipt. In this setup, the point-of-sale only needs to send the electronic receipt, and the accounting system extracts the needed information for balancing of accounts and bookkeeping.

The information about the item may comprise any combination of information from the group of: purchase date, purchase time, name of the point-of-sale, location, price, purchased items, category of purchased item, and the like.

In an advantageous embodiment, the user in step a) purchases a plurality of items, and wherein the point-of-sale generates a separate electronic receipt for each item in step b) and/or the accounting system in steps e) and f) extracts price and information for each item and stores said price and information in separate records for each item. A purchase often involves more than one item. The method according to the invention may automatically divide such a purpose into separate records, such that each purchased item is properly balanced and entered into the bookkeeping records.

In general, the point-of-sale should generate and send the amount and information about each separate post or purchased item, but should also generate and send the total amount, which is used to balance the bank account or credit and debit card account.

The user may use a debit card, a credit card or a mobile phone or other utilities for purchasing the item.

In one embodiment, the price and information about the purchased item is sent to a provider of the debit card, credit card or mobile phone. Accordingly, the credit card company, bank or the like is also informed about the purchase, and an associated account may be automatically balanced or updated.

In an advantageous embodiment, the point-of-sale or accounting system further store information related to the item purchased in step a), and wherein the point-of-sale or accounting system generate an offer and/or advertising profile based on said item, so that the point-of-sale may send offers and/or advertisements to the user based on items purchased. Thus, the point-of-sale may provide customised and targeted offer and/or advertisement to a user based on a purchase history. The user may advantageously accept or decline that offers and/or advertisements are pushed to the user. In practice this may be achieved by ticking on or off a particular box in the user profile, or this may be achieved by accepting or declining this following each purchase.

According to a second aspect, the invention provides a system for handling purchase transactions between a user and point-of-sales, wherein the system comprises a user profile and a point-of-sale, and an accounting system for bookkeeping and archiving receipts, wherein
  the user profile comprises information about the user and
    associated bank and credit- and debit account details,
    wherein
  the system further comprises:
    a receipt module for generating an electronic receipt for
      an item purchased by the user at the point-of-sale,
    a transmitter for transmitting the electronic receipt to
      the accounting system, and
  wherein
  the system for handling purchase transaction comprises an
    extraction module for extracting price and information
    about a purchased item, and wherein
  the accounting system comprises:
    a receipt storage module for storing electronic receipts,
      and
    a bookkeeping module for storing the price and information about the purchased item.

Thereby, the invention provides a system, where purchased items may automatically be entered into accounts, and where balancing of bookkeeping records is automatically carried out upon a purchase of such items. Further, the receipts are automatically stored, whereby a user at any time can check the receipts for possible errors.

The handling of the system may happen in real time, especially if the user profile is set up for automatic handling. This may be a general feature or set up for one or more point of sales or items. The user profile can also be set to suggest certain handling for certain point of sales which is then confirmed by the user. Accordingly, the system preferably comprises a plurality of point-of-sales. However, the user can also handle price and information and receipts manually via a front-end immediately after a purchase and after the price and information and receipt has been received. This in order to post the purchase and to balance the account and to store the receipt.

The receipt module and transmitter may advantageously be implemented at the point-of-sale.

The bookkeeping, balancing and storage may be carried out in real-time, whereby the user can instantly access his or her account to check the records.

The point-of-sale may be a physical shop or an online shop, or in other words a seller. So the purchase may be made either in the physical shop and the item bought via a point-of-sale terminal, or the purchase may be carried out via the Internet. This can for instance be a single payment or a recurring payment (standing order mandate) via net banking.

The user may be consumer or a buyer.

The purchase item may be consumer goods or the like.

The account details may comprise a credit card number, debit card number, bank account number, phone number or the like associated with the user.

The accounting system may of course also be provided with a transmitter and receiver for receiving communication.

In a first embodiment, the extraction module is integrated in the first-point-of sale. Thus, the point-of-sale extracts the needed information and sends this to the accounting system.

In a second embodiment, the extraction module is integrated in the accounting system. Thereby, the accounting system may extract the needed information, e.g. from the electronic receipt, which may simplify the system from the seller's perspective.

In a preferred embodiment, the accounting system comprises an external server or cloud. Thus, the accounting system may in practice be handled by a software program installed on the external server or cloud, and which provides a user access to his or her accounts.

In another preferred embodiment, the point-of-sale further comprises a warranty module for generating an electronic warranty associated with the purchased item, and the accounting system comprises a warranty storage module for storing the electronic warranty. Thereby, warranties for purchased items are automatically generated and stored in the system, and the user may access a record of warranties for purchased item at any time.

According to one embodiment, the accounting system further comprises a service provider, such as a credit card provider or debit card provider. The first-point-of sale may send the price and information as well as receipt etc. related to the purchased item directly to the service provider, which may then relay the received information to an external server. Alternatively, the point-of-sale may send the information to both the service provider and external server. In practice, the system and servers of the service provider may be perceived as a separate system or part of the overall accounting system.

BRIEF DESCRIPTION OF THE FIGURES

The invention is explained in detail below with reference to embodiments shown in the drawings, in which.

DETAILED DESCRIPTION OF THE INVENTION

Figure 1:
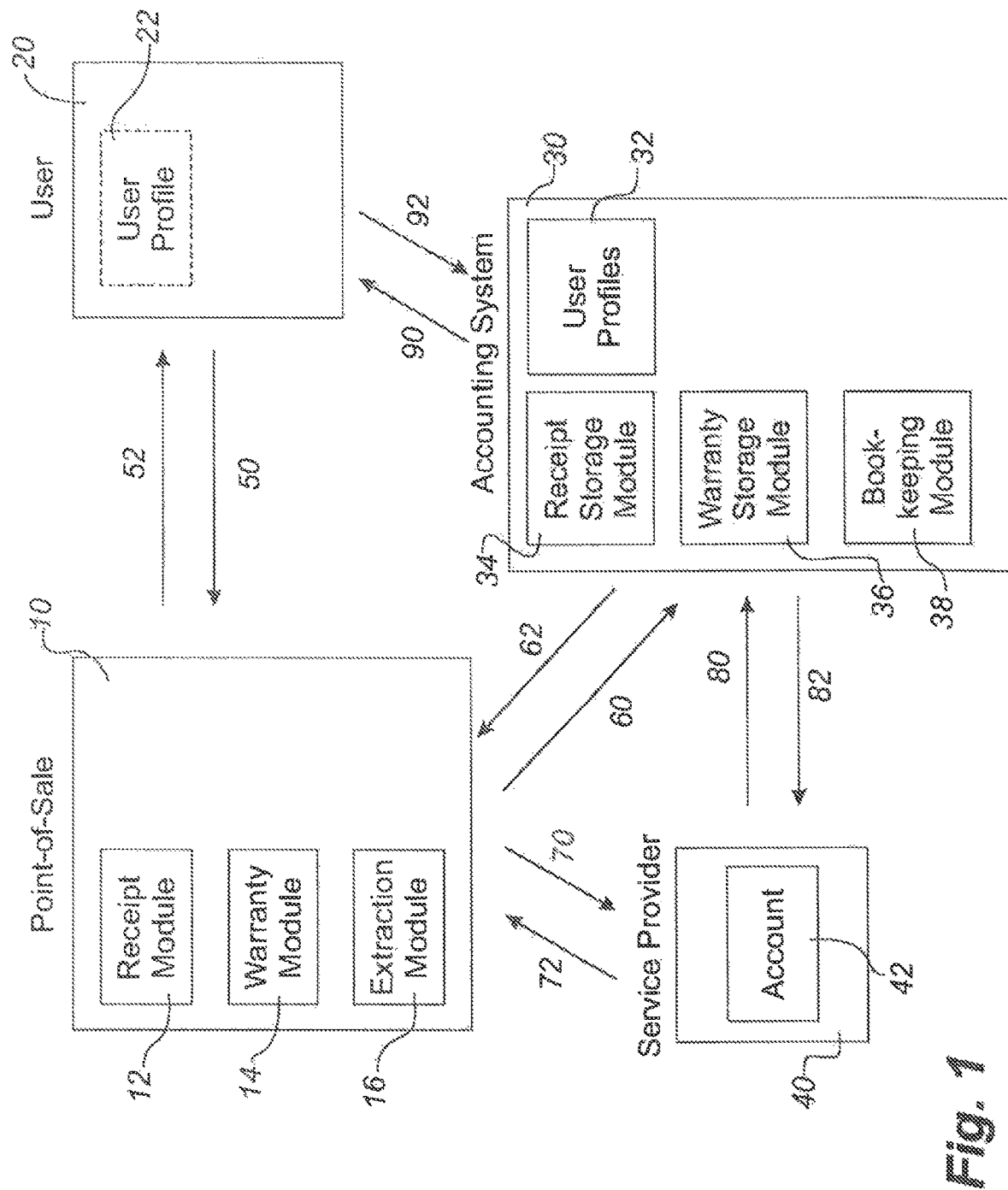
FIG. 1 shows one embodiment of a system for handling and storing purchase transactions between a user and point-of-sales according to the invention.

A system for handling and storing purchase transactions between a user and point-of-sales is depicted in FIG. 1.

The system comprises a number of point-of-sales 10, which may be in form of a physical store or an online store or a company, and a user 20. The point-of-sale 10 comprises a receipt module 12 for generating electronic receipts, a warranty module 14 for generating electronic warranties, and an extraction module 16 for extracting a price and information about an item for sale. The extraction module 16 may also be implemented at the user 20, e.g. in an app installed on a smart phone.

When the user 20 purchases (illustrated with arrow 50) an item (or items) from the point-of-sale 10, the point-of-sale 10 generates an electronic receipt related to the purchased item via the receipt module 12, and an electronic warranty related to the purchased item via the warranty module 14. The point-of-sale 10 further extracts a price and information about the purchased item via the extraction module 16. The point-of-sale 10 may send the electronic receipt to the user 20 or print a physical receipt to the user 10 (as illustrated with arrow 52). However, the system according to the invention makes the necessity of physical receipts superfluous. The purchase may be carried out via a point-of-sale terminal in a physical shop and the user 20 may use a debit card, a credit card or a mobile phone for the payment. If the purchase is carried out online, the user 20 may enter a credit card number or debit card number or other into the system in order to facilitate the payment.

The point-of-sale 10 sends (illustrated with arrow 60) the electronic receipt, the warranty, and the price and information about the purchased item to an accounting system 30. This will be carried out electronically, and may be carried out via an email, a document transfer, text message, MMS or the like. The point-of-sale 10 may further relay (illustrated with arrow 70) the price and information about the purchased item to a service provider 40, such as a credit card provider, a bank or the like. The service provider 40 comprises an account 42 associated with the user, e.g. the credit card or debit card of the user. Accordingly, the account 42 at the service provider 40 may automatically be updated and balanced by entering the post and automatically sending the post to the service provider 40, thus balancing the bank account or credit/debit card account so that it is clear which payment have been checked off.

Further, as known from prior art systems, if there is not sufficient funds in the account 42, the service provider 40 may send a warning (illustrated with arrow 72) to the point-of-sale 10 and the purchase may be cancelled.

The information about the location or address, e.g. a telephone number, IP-address, or email address, of the accounting system 30 may be associated with the user profile 22 or by the payment method or account used. Thus, the point-of-sale 10 may receive the information about the location or address from the user profile 22 or the payment method, after which the point-of-sale 10 sends the information and price about the payment as well as the electronic receipt to said location or address. The information about the location and address may also be provided by the user 20. Thus, the system may also be able to handle cash purchases.

The accounting system 30 may be provided by a software program, which is installed on an external server or cloud. The accounting system 30 comprises a number of user profiles 32 associated with different user profiles or companies. The accounting system 30 further comprises a receipt storage module or folder 34, a warranty storage module or folder 36, and a bookkeeping module 38. Once the electronic receipt, the electronic warranty, and the price and information about the purchased item is received by the accounting system 30, the electronic receipt is stored in the receipt storage module 34, and the electronic warranty is stored in a warranty storage module. Further, the price and information about the purchased item is entered into the bookkeeping module and associated by a user profile of the user. Thereby, the bookkeeping records are automatically updated upon purchase of an item. Further the receipt and warranty are automatically stored in the accounting system 30, whereby the user can check the receipt and warranty for possible errors. In practice, the receipt may also function as the warranty, in which case only the receipt needs to be stored or duplicated.

In the shown embodiment, the price and information about the purchased item is sent directly to the accounting system 30. However, it may also be relayed to the accounting system 30 via the service provider 40, in which case the service provider 40 may perceived as being part of the accounting system 30. In yet another embodiment, the price and information is sent to the user 20, e.g. to a smart phone or PC of the user 20, which then relays it to the accounting system 30.

The bookkeeping module 38 may be installed on the external server. However, it may also be installed on an additional server. The bookkeeping module 38 may for instance be an Enterprise Resource Planning (ERP) system, such as SAP, in which case the price and information about the purchased item need not to be store on the external server or cloud. However, in a preferred embodiment, the bookkeeping module 38 is stored on the external server and balanced upon receipt of price and information about the purchased item. If an ERP system or the like needs to be updated, the accounting system 30 may relay the price and information to the ERP system (not shown). This may be particular advantageous for companies or firms.

In the shown solution, the extraction module 16 is implemented at the point-of-sale 10, such that the point-of-sale 10 sends the price and information about the purchased item to the accounting system 30. However, the extraction module 16 may be implemented on the accounting system 30 instead, and the extraction module may for instance extract the price and information about the price from the electronic receipt.

The information about the purchased item may comprise any combination of the following: purchase date, purchase time, name of the point-of-sale, location, price, product name, manufacturer name, product type or category, and the like. Thus, a number of details may be stored in the bookkeeping module, which may be important for accounting and tax purposes.

The user profile 32 of a user may have entered an associated budget, e.g. a forecast of spending for an individual or a family, or a maximum spend per day or per month. If the budget has been exceeded, the accounting system 60 may transmit a warning (illustrated with arrow 62), maybe in order to cancel the purchase. The accounting system 62 may also precautionary send (illustrated with arrow 82) the warning to the service provider 40.

Once a purchase has been carried out, the accounting system 30 may also update the user profile 32 associated with the user, e.g. updating a purchase history and an offer/advertising profile. The accounting system 30 may send the offer/advertising profile to the point-of-sale 10 and other point-of-sales, i.e. shops, whereby the point-of-sale may generate target offer/advertisements to the user 20 based on the user's purchase history. The user 20 will have an option to accept or decline such targeted advertisements. The user 20 may also request for an offer/adverting profile to be set up, in which case, the user 20 do not have to accept or decline the targeted offers/advertisements.

The user 20 may have access to his or her user profile 22 and account details via a front end that mirrors the user profile 32 from the accounting system 30. The front end may be a software program installed on a PC or a MAC, or it may be a software application installed on a smart device, such as a smart phone or a tablet. The front end may also be web-based so that the user 20 may access the user profile 22 and account details from anywhere. The user 20 may thus access the user profile 22 and account details from anywhere via the app or the web-based access. The accounting system 30 pushes (illustrated with arrow 90) the updated user profile and account details to the front end. The user 20 may update the user profile 22 via the front end, which is then sent to the accounting system 30 (illustrated with arrow 92). The user may set preferences, such as budgets, advertising preferences and the like.

It is possible for a user to set up a plurality of user profiles. Thereby, the user can have several bookkeeping records and accounts balanced. The bookkeeping records and accounts of the plurality of user profiles may be shown separately, but may also be combined to show complete bookkeeping records and accounts. This is particular relevant for companies and firms, which may have several employees and departments. Thus, the system allows showing the spending of separate users or departments and for the entire company or firm.

The purchase may comprise a plurality of items. In such a case, the point-of-sale may generate a separate electronic receipt and possible electronic warranty for each item. The price and information about each item is extracted and stored in separate records in the bookkeeping module 38, such that each purchased item is properly balanced and entered into the bookkeeping records.

The entire system is updated in real-time. Thus, the user having for instance a mobile phone may instant access his or her account to check the records to see if any errors have occurred, but more importantly to check off purchases and balancing the accounts as well as storing the electronic receipts.

Figure 2:
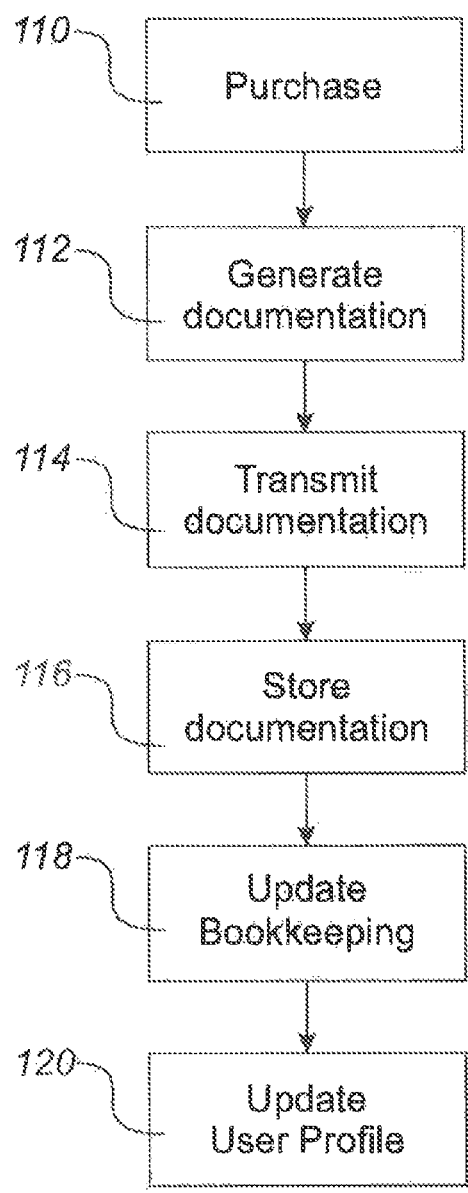
FIG. 2 shows steps in a method for handling and storing purchase transactions between a user and point-of-sales according to the invention.

FIG. 2 illustrates the method for handling and storing purchase transactions between a user and point-of-sales according to the invention.

In a first step 110, a user purchases an item from a point-of-sale, either in a physical shop or via an online shop. In a second step 112, the point-of-sale generates documentation. The documentation may comprise an electronic receipt, an electronic warranty, and a price and information about the purchased item. The documentation is then in a third step 114 transmitted to the accounting system. In a fourth step 116, the documentation is stored in the accounting system. The accounting system may for instance store the electronic receipt in a dedicated folder on a server, where the dedicated folder may be associated with the user profile of the user. The accounting system may further store the electronic warranty in a dedicated folder. The user may be prompted to decide if the electronic receipt should be stored as an electronic warranty. In a fifth step 118, the bookkeeping records and accounts related to the user's user profile are updated and balanced. Further, the user profile may in a sixth step 120 be updated, e.g. to reflect a purchase history and purchase preferences.

The accounting system may generate a warning and send this to the user, if the purchase exceeds a predetermined budget for said user.

The accounting system may further store a date about an expiry of a warranty. The accounting system sends a warning to the user a predetermined number of days before the expiry of the warranty. Thus, the user receives a reminder of the expiry of the warranty, whereby the user is able to check the purchased item a final time for possible defects within the warranty period. The accounting system may advantageously generate and store the date about the expiry of the warranty based on national or regional laws of the location of the point-of-sale. The system or software program may continuously be updated with changes in national law so that the user at all times is ensured that the warranty laws are complied with.

The accounting system (or point-of-sale) may be based on the user profile generate targeted advertisements, which may be pushed to the user's front end. The user may accept or decline to receive advertisements, which can be set up by editing the preferences of the user profile.

The accounting system 30 and user 20 have been shown as two different systems, i.e. a smart phone or PC of the user 20, and an external server 30. However, in a simple embodiment, the accounting system 30 may also be implemented on the PC or smart phone of the user 20.

The invention has been described with reference to advantageous embodiments. However, the scope of the invention is not limited to the illustrated embodiments, and alterations and modifications can be carried out without deviating from the scope of the invention, which is defined by the claims.

The invention claimed is:

1. A system for handling and storing a non-physical sales receipt, thereby updating one or more accounting and/or bookkeeping systems, the system comprising:
a computing and/or cloud system having a processor and/or a database of the system in electronic communication with a point-of-sale (POS) computing device, that receives, handles, and stores information relating to a non-physical sales receipt generated when a user purchases an item from a POS via the POS computing device when the user pays with one or more of a credit card, a debit card, a mobile phone, a bank account, cash or another payment device and provides one or more unique user identification parameters, each linking to a communication address of the user;
the POS being a physical or online location where sales transactions are made;
the POS computing system comprising one or more of a payment terminal, a desktop computer, a laptop computer, a smartphone, a smart device, a processor, a database, and a tablet, wherein software on the POS computing device compares the unique user identification parameter with a list of unique user identification parameters, each pointing to a user, and/or a communication address of the user, that identifies a user profile in the database;
wherein the POS computing device generates a non-physical sales receipt and information that includes a list of purchase related information, and sends the non-physical sales receipt and the purchase related information to the processor using the communication address of the user;
the non-physical sales receipt comprising one or more of a digital sales receipt, electronic sales receipt, other non-physical form, and/or a physical sales receipt that has been transformed into a digital sales receipt and/or an electronic sales receipt, by means of the user photographing that physical sales receipt;
the purchase related information comprising both purchase related information and purchase related parameters including one or more of name of the POS, purchase date and time, prices relating to purchase location or address of seller, number of purchased items, category of each purchased item, manufacturer, taxes paid, product identifier code that is scannable or computer readable or combinations thereof;
wherein the processor and/or a database of the computing and/or cloud system analyzes and compares the non-physical sales receipt and purchase related information received, and one or more account details and one or more account numbers relating to the purchase and the user are identified based on configurable parameters, and the processor and/or a database stores the non-physical sales receipt and the purchase related information corresponding to the one or more account details and the one or more account numbers that have been identified electronically in the processor and/or database of the computing and/or cloud system; and
wherein the account details are a part of a bookkeeping and/or accounting module of the computing and/or cloud system that receives and stores the non-physical sales receipt and the purchase related information, analyzing and updating accounting and/or bookkeeping records and pushes an updated user profile and/or account to a user computing device that mirrors a user profile maintained on the processor and/or database, enabling instant access by the user computing device to the updated user profile account.

2. The system according to claim 1, wherein analysis of the non-physical sales receipt and the purchase related information comprises generating and storing an expiry date of a product warranty based on one or more of date, national or regional laws, warranty information regarding a specific seller, warranty information regarding a specific product or product type, or warranty information regarding a specific manufacturer name, related to a location of the POS computing device.

3. The system according to claim 1, wherein analyzing and updating of the accounting and/or bookkeeping records in real time or any other time interval, and/or or when a user computing device is connected to a wireless network, relating to spending and budget based on user configured parameters, cause the bookkeeping and/or accounting module to generate a warning message based on user configured parameters and send this message to a local computing device of the user.

4. The system according to claim 1, wherein an accounting system is one or more of an accounting module and/or system, a bookkeeping module and/or system, or an Enterprise Resource Planning system (an ERP system).

5. The system according to claim 4, wherein the bookkeeping module is responsible for identifying, analyzing, and reporting, transaction data, wherein the bookkeeping module is part of a software program and responsible for recording transactions and automatically analyzing and updating accounting and/or bookkeeping records in real time or any other time interval, and/or when a user computing device is connected to a wireless network.

6. The system according to claim 5, wherein the bookkeeping module is mapped to, and synchronized with, other external systems and/or modules, which comprise of one or more of an accounting module and/or system, a bookkeeping module and/or system, or an Enterprise Resource Planning system (an ERP system).

7. The system according to claim 1, wherein both handling and storing information relating to the non-physical sales receipt comprise use of Artificial Intelligence (AI) to make educated suggestions or make decisions regarding how sales receipts are handled, stored and utilized.

8. The system according to claim 1, wherein AI is used to determine or recommend when a warranty is stored.

9. The system according to claim 1, wherein updating the accounting and/or bookkeeping records of one or more accounting systems occurs in real time, or any other time interval, and/or when a user computing device is connected to a wireless network.

10. The system according to claim 1, wherein a unique user identification parameter is electronic and/or digital, and comprises one or more of credit/debit card number, phone number, bank account number, another payment method which uniquely identifies the user, near-field communication (NFC technology), machine readable code, Bluetooth, email, or technology that enables the POS to uniquely identify a user.

11. The system according to claim 1, wherein one or more configurable parameters enables identifying one or more pre-defined account details and one or more pre-defined account numbers for certain values of a purchase related information that are one or more of pre-defined and/or defined manually by the user or other users, AI based suggestions, which, based on user input, enable machine learning, to enable AI to make more accurate suggestions and/or decisions, defined automatically by AI, or combinations thereof;
wherein a parameter of the purchase related information is compared with a list of configurable parameters to provide one or more pre-defined account details and one or more pre-defined account numbers for certain values of the purchase related information, and when the purchase related parameter exists on the list of configurable parameters pre-defined in a user profile, the non-physical sales receipt and the related information are allocated to the one or more account details and the one or more account numbers specified for the configurable parameter.

12. The system according to claim 1, wherein a user computing device of the user comprises of one or more of a desktop computer, a laptop computer, a smartphone, a smart device and a tablet, which grants the user indirect and/or direct access to a software program in the form of a web-based application that is accessed through installing an application on a local device or through a browser, wherein:
the user computing device receives, at the communication address of the user, the non-physical sales receipt and the purchase related information generated and sent by the POS computing device; the user computing device enables the user to receive a purchase notification corresponding to the non-physical sales receipt and the purchase related information;
the user computing device enables the user to approve or reject the purchase based on the non-physical sales receipt, the purchase related information, and the configured parameters; and
the user computing device manually and/or automatically synchronizes with the database or processor, and synchronization occurs in real-time or any other time interval, and/or when the user computing device is connected to a wireless network, updating accounting and/or bookkeeping records.

13. The system according to claim 12, wherein after a non-physical sales receipt and the purchase related information is received, which does not include certain wanted purchase related information, the processor or database extracts the wanted purchase related information, or the user directly enters the wanted purchase related information manually by key entry on a front end of the user computing device, local scanning or data entry using the user computing device, the non-physical sales receipt and the purchase related information comprising the wanted purchase related information are then automatically stored in an account plan and an account plan number related to said non-physical sales receipt.

14. The system according to claim 12, wherein said accounting and/or bookkeeping system enables sending a message based on user configured parameters to the user computing device, whereby the user computing device is enabled to instantly access a user profile and account to check the records via the user computing device that mirrors a user profile maintained on the account system, the processor and/or the database.

15. The system according to claim 1, wherein the database is cloud-based or situated on an onsite processor.

16. The system according to claim 1, wherein the system processes and reads non-physical sales receipts and purchase related information.

17. The system according to claim 1, wherein a warning message being generated and sent to a local computing device of the user, comprises a purchase notification, which also serves as a fraud notification, whereby the configured parameters comprise one or more of a transaction amount, frequency/occurrence of payment, date and time, location, name of POS, payment type, and unique payment ID.

18. The system according to claim 1, wherein a user accepts or declines a POS request to use data of that user and contact that user.

19. The system according to claim 1, wherein a user accepts or declines a system request to use data of that user and contact that user.

20. A method comprising handling and storing a non-physical sales receipt, thereby updating one or more accounting and/or bookkeeping systems, the method comprising:
(a) receiving, handling and storing information relating to the non-physical sales receipt, using a processor and/or a database of a computing and/or cloud system, when a user purchases an item from a point-of-sale (POS) via a POS computing device, wherein the user pays with one or more of a credit card, a debit card, a mobile phone, a bank account, cash or another payment device and provides one or more unique user identification parameters, each linking to a communication address of the user;
(b) the POS computing device generating a non-physical sales receipt and information comprising a list of purchase related information, and sending the non-physical sales receipt and the purchase related information to the processor of the computing and/or cloud system using the communication address of the user;
wherein the POS comprises a physical or online location where sales transactions are made;
wherein the POS computing system comprises one or more of a payment terminal, a desktop computer, a laptop computer, a smartphone, a smart device, a processor, a database, and a tablet, wherein software on the POS computing device compares the unique user identification parameter with a list of unique user identification parameters, each pointing to a user, and/or a communication address of the user, that identifies a user profile in the database;
wherein, non-physical sales receipt comprises one or more of a digital sales receipt, electronic sales receipt, other non-physical form, and/or a physical sales receipt that has been transformed into a digital sales receipt and/or an electronic sales receipt, by means of the user photographing that physical sales receipt;
wherein purchase related information comprises both purchase related information and purchase related parameters including one or more of name of the POS, purchase date and time, prices relating to purchase location or address of seller, number of purchased items, category of each purchased item, manufacturer, taxes paid, product identifier code that is scannable or computer readable or combinations thereof;
(c) analyzing and relating the non-physical sales receipt and purchase related information, received to one or more account details and one or more account numbers relating to the purchase and the user, identified based on configurable parameters, and storing electronically, using the processor and/or a database of the computing and/or cloud system, the non-physical sales receipt and the purchase related information based on the one or more account details and the one or more account numbers that have been identified;
(d) analyzing and updating accounting and/or bookkeeping records, wherein the account details are a part of a bookkeeping module of the computing and/or cloud system that receives and stores the non-physical sales receipt and the purchase related information used for analyzing and updating accounting and/or bookkeeping records, and
(e) pushing, by the processor of the computing and/or cloud system, an updated user profile and/or account to a user computing device that mirrors a user profile maintained on the processor and/or database of the computing and/or cloud system, enabling instant access by the user computing device to the updated user profile account.

21. The method according to claim 20, wherein analysis of the non-physical sales receipt and the purchase related information comprises generating and storing an expiry date of a product warranty based on one or more of date, national or regional laws of a location of a POS, warranty information regarding a specific seller, warranty information regarding a specific product or product type, or warranty information regarding a specific manufacturer name.

22. The method according to claim 20, wherein analyzing and updating of the accounting and/or bookkeeping records in real time or any other time interval and/or when a user computing device is connected to a wireless network, relating to spending and budget based on user configured parameters, cause the bookkeeping and/or accounting module to generate a warning message based on user configured parameters and send this message to a local computing device of the user.

23. The method according to claim 20, wherein an accounting system is one or more of an accounting module and/or system, a bookkeeping module and/or system, an Enterprise Resource Planning system (an ERP system).

24. The method according to claim 23, wherein the bookkeeping module is responsible for identifying, analyzing, and reporting, transaction data, wherein the bookkeeping module is part of a software program and responsible for recording financial transactions and automatically analyzing and updating accounting and/or bookkeeping records in real time or any other time interval, and/or when a user computing device is connected to a wireless network.

25. The method according to claim 24, wherein the bookkeeping module is mapped to and synchronized with other external systems and/or modules, which comprise of one or more an accounting module and/or system, a bookkeeping module and/or system, an Enterprise Resource Planning system (an ERP system).

26. The method according to claim 20, wherein both handling and storing information relating to the non-physical sales receipt comprise the use of Artificial Intelligence (AI) to make educated suggestions or make decisions regarding how sales receipts are handled, stored and utilized.

27. The method according to claim 20, wherein AI is used to determine or recommend when a warranty is stored.

28. The method according to claim 20, wherein updating the accounting and/or bookkeeping records of the account system occurs in real time, or any other time interval, and/or when a user computing device is connected to a wireless network.

29. The method according to claim 20, wherein a unique user identification parameter is electronic and/or digital, and comprises one or more of credit/debit card number, phone number, bank account number, another payment method which uniquely identifies the user, near-field communication (NFC technology), machine readable code, Bluetooth, email, or technology that enables the POS computing device to uniquely identify a user.

30. The method according to claim 20, wherein one or more configurable parameters enables identifying one or more pre-defined account details and one or more pre-defined account numbers for certain values of a purchase related information, wherein the configurable parameters are one or more of be pre-defined and/or defined manually by the user or other users, AI based suggestions, which based on user input enables machine learning, and hence enable AI to make more accurate suggestions and/or decisions, defined automatically by AI or combinations thereof;
wherein a parameter of the purchase related information is compared with a list of configurable parameters to one or more pre-defined account details and one or more pre-defined account numbers for certain values of the purchase related information, and when the purchase related parameter exists on the list of configurable parameters pre-defined in a user profile, the non-physical sales receipt and the related information are allocated to the one or more account details and one or more account numbers specified for the configurable parameter.

31. The method according to claim 20, wherein a user computing device of the user comprises of one or more of a desktop computer, a laptop computer, a smartphone, a smart device and a tablet, which grants the user indirect and/or direct access to a software program in the form of a web-based application that is accessed through installing an application on a local device or through a browser, wherein:

the user computing device receives, at the communication address of the user, the non-physical sales receipt and the purchase related information generated and sent by the POS computing device;

the user computing device enables the user to receive a purchase notification corresponding to the non-physical sales receipt and the purchase related information;

the user computing device enables the user to approve or reject the purchase based on the non-physical sales receipt, the purchase related information, and the configured parameters; and the user computing device then manually and/or automatically synchronizes with the database or processor of the computing and/or cloud system, where the software program is executed, and synchronization occurs in real-time, or any other time interval, and/or when the user computing device is connected to a wireless network, updating accounting and/or bookkeeping records.

32. The method according to claim 31, wherein after a non-physical sales receipt and the purchase related information are received, which does not include certain wanted purchase related information, the processor or database extracts the wanted purchase related information, or the user directly enters the wanted purchase related information manually by key entry on a front end of the user computing device, local scanning or data entry using the user computing device, the non-physical sales receipt and the purchase related information comprising the wanted purchase related information are then automatically stored in one or more account details and one or more account numbers related to said non-physical sales receipt.

33. The method according to claim 32, wherein the accounting and/or bookkeeping system sends a message based on user configured parameters to the user computing device, whereby the user instantly accesses a user profile and account to check the accounting records via the user computing device that mirrors a user profile maintained on the account system and/or the database.

34. The method according to claim 20, wherein the database is cloud-based or situated on an onsite processor.

35. The method according to claim 20, wherein the system processes and reads non-physical sales receipts and purchase related information.

36. The method according to claim 20, wherein a warning message being generated and sent to a local computing device of the user, comprises a purchase notification, which comprises a fraud notification, whereby the configured parameters comprise one or more of transaction amount, frequency/occurrence of payment, date and time, location, name of POS, payment type, and unique payment ID.

37. The method according to claim 20, wherein a user accepts or declines a POS request to use data of a user and contact a user.

38. The method according to claim 20, wherein a user accepts or declines a system request to use data of a user and contact a user.

39. A system for handling and storing a non-physical sales receipt, thereby updating one or more accounting and/or bookkeeping systems, the system comprising:

a user computing device in electronic communication with a point-of-sale (POS) computing device, that receives, handles, and stores information relating to a non-physical sales receipt generated when a user purchases an item from a POS via the POS computing device, wherein the user pays with one or more of a credit card, a debit card, a mobile phone, a bank account, cash or another payment device and the user provides one or more unique user identification parameters, each linking to a communication address of the user;

the POS being a physical or online location where sales transactions are made;

the POS computing system comprising one or more of a payment terminal, a desktop computer, a laptop computer, a smartphone, a smart device, a processor, a database, and a tablet, wherein software on the POS computing device compares the unique user identification parameter with a list of unique user identification parameters, each pointing to a user, and/or a communication address of the user, that identifies a user profile in a database;

wherein the user computing device sends the communication address of the user to the POS computing device that generates a non-physical sales receipt and information that includes a list of purchase related information, and receives the non-physical sales receipt and the purchase related information at the user computing device using the communication address of the user;

the non-physical sales receipt comprising one or more of a digital sales receipt, electronic sales receipt, other non-physical form, and/or a physical sales receipt that has been transformed into a digital sales receipt and/or an electronic sales receipt, by means of the user photographing that physical sales receipt;

the purchase related information comprising both purchase related information and purchase related parameters including one or more of name of the POS, purchase date and time, prices relating to purchase location or address of seller, number of purchased items, category of each purchased item, manufacturer, taxes paid, product identifier code that is scannable or computer readable or combinations thereof;

wherein the user computing device analyzes and compares the non-physical sales receipt and purchase related information received at the electronic communication address of the user, and one or more account details and one or more account numbers relating to the purchase and the user are identified based on configurable parameters, and the user computing device stores the non-physical sales receipt and the purchase related information corresponding to the one or more account details and the one or more account numbers that have been identified electronically in a database of a computing and/or cloud system; and wherein the account details are a part of a bookkeeping and/or accounting module of the computing and/or cloud system that receives and stores the non-physical sales receipt and the purchase related information, analyzing and updating accounting and/or bookkeeping records and pushes an updated user profile and/or account to the user computing device that mirrors a user profile maintained on the database, enabling instant access by the user on the user computing device to the updated user profile account.

40. The system according to claim 39, wherein analysis of the non-physical sales receipt and the purchase related information comprises generating and storing an expiry date of a product warranty based on one or more of date, national or regional laws, warranty information regarding a specific seller, warranty information regarding a specific product or product type, or warranty information regarding a specific manufacturer name, related to a location of the POS computing device.

41. The system according to claim 39, wherein analyzing and updating of the accounting and/or bookkeeping records in real time, or any other time interval, and/or when the user computing device is connected to a wireless network, relating to spending and budget based on user configured parameters, cause the bookkeeping module to generate a warning message based on user configured parameters and send this message to one or more local user computing devices.

42. The system according to claim 39, wherein an accounting system is one or more of an accounting module and/or system, a bookkeeping module and/or system, or an Enterprise Resource Planning system (an ERP system).

43. The system according to claim 42, wherein the bookkeeping module is responsible for identifying, analyzing, and reporting, transaction data, wherein the bookkeeping module is part of a software program and responsible for recording transactions and automatically analyzing and updating accounting and/or bookkeeping records in real time, or any other time interval, and/or when the user computing device is connected to a wireless network.

44. The system according to claim 43, wherein the bookkeeping module is mapped to, and synchronized with, other external systems and/or modules, which comprise of one or more of an accounting module and/or system, a bookkeeping module and/or system, or an Enterprise Resource Planning system (an ERP system).

45. The system according to claim 39, wherein both handling and storing information relating to the non-physical sales receipt comprise the use of Artificial Intelligence (AI) to make educated suggestions or make decisions regarding how sales receipts are handled, stored and utilized.

46. The system according to claim 39, wherein AI is used to determine or recommend when a warranty is stored.

47. The system according to claim 39, wherein updating the accounting and/or bookkeeping records of one or more accounting systems occurs in real time, or any other time interval, and/or when the user computing device is connected to a wireless network.

48. The system according to claim 39, wherein a unique user identification parameter is electronic and/or digital, and comprises one or more of credit/debit card number, phone number, bank account number, another payment method which uniquely identifies the user, near-field communication (NFC technology), machine readable code, Bluetooth, email, or technology that enables the POS to uniquely identify a user.

49. The system according to claim 39, wherein one or more configurable parameters enables identifying one or more pre-defined account details and one or more pre-defined account numbers for certain values of a purchase related information that are one or more of pre-defined and/or defined manually by the user or other users, AI based suggestions, which, based on user input, enable machine learning, to enable AI to make more accurate suggestions and/or decisions, defined automatically by AI, or combinations thereof;
wherein a parameter of the purchase related information is compared with a list of configurable parameters to provide one or more pre-defined account details and one or more pre-defined account numbers for certain values of the purchase related information, and when the purchase related parameter exists on the list of configurable parameters pre-defined in a user profile, the non-physical sales receipt and the related information are allocated to the one or more account details and the one or more account numbers specified for the configurable parameter.

50. The system according to claim 39, wherein the user computing device comprises of one or more of a desktop computer, a laptop computer, a smartphone, a smart device and a tablet, which grants the user indirect and/or direct access to a software program in the form of a web-based application that is accessed through installing an application on the user computing device or through a browser, wherein:
the user computing device receives, at the communication address of the user, the non-physical sales receipt and the purchase related information generated and sent by the POS computing device;
the user computing device enables the user to receive a purchase notification corresponding to the non-physical sales receipt and the purchase related information;
the user computing device enables the user to approve or reject the purchase based on the non-physical sales receipt, the purchase related information, and the configured parameters; and
the user computing device manually and/or automatically synchronizes with the database or processor of the computing and/or cloud system, where the software program is executed, and synchronization occurs in real-time, or any other time interval, and/or when the user computing device is connected to a wireless network, updating accounting and/or bookkeeping records.

51. The system according to claim 50, wherein after a non-physical sales receipt and the purchase related information is received, which does not include certain wanted purchase related information, the user computing device extracts the wanted purchase related information, or the user directly enters the wanted purchase related information manually by key entry on a front end of the user computing device, local scanning or data entry using the user computing device, the non-physical sales receipt and the purchase related information comprising the wanted purchase related information are then automatically stored in an account plan and an account plan number related to said non-physical sales receipt.

52. The system according to claim 51, wherein said accounting and/or bookkeeping system enables sending a message based on user configured parameters to the user computing device, whereby the user is enabled to instantly access the user profile and account to check the records via the user computing device that mirrors a user profile maintained on the account system and/or a database.

53. The system according to claim 39, wherein the database is cloud-based or situated on an onsite processor.

54. The system according to claim 39, wherein the system processes and reads non-physical sales receipts and purchase related information.

55. The system according to claim 39, wherein a warning message being generated and sent to the user computing device, comprises a purchase notification, which also serves as a fraud notification, whereby the configured parameters comprise one or more of a transaction amount, frequency/occurrence of payment, date and time, location, name of POS, payment type, and unique payment ID.

56. The system according to claim 39, wherein a user accepts or declines a POS request to use data of that user and contact that user.

57. The system according to claim 39, wherein a user accepts or declines a system request to use data of that user and contact that user.

58. A method comprising handling and storing a non-physical sales receipt, thereby updating one or more accounting and/or bookkeeping systems, the method comprising:
  (a) receiving, handling and storing information relating to the non-physical sales receipt, using a user computing device and a processor and/or a database of a computing and/or cloud system, when a user purchases an item from a point-of-sale (POS) via a POS computing device, wherein the user pays with one or more of a credit card, a debit card, a mobile phone, a bank account, cash or another payment device and the user provides one or more unique user identification parameters, each linking to a communication address of the user;
  (b) providing the communication address of the user to the POS computing device, wherein the POS computing device generates a non-physical sales receipt and information comprising a list of purchase related information, and receiving the non-physical sales receipt and the purchase related information at the user computing device using the communication address of the user;
  wherein the POS comprises a physical or online location where sales transactions are made;
  wherein the POS computing system comprises one or more of a payment terminal, a desktop computer, a laptop computer, a smartphone, a smart device, a processor, a database, and a tablet, wherein software on the POS computing device compares the unique user identification parameter with a list of unique user identification parameters, each pointing to a user, and/or a communication address of the user, that identifies a user profile in the database;
  wherein, non-physical sales receipt comprises one or more of a digital sales receipt, electronic sales receipt, other non-physical form, and/or a physical sales receipt that has been transformed into a digital sales receipt and/or an electronic sales receipt, by means of the user photographing that physical sales receipt;
  wherein purchase related information comprises both purchase related information and purchase related parameters including one or more of name of a POS, purchase date and time, prices relating to purchase location or address of seller, number of purchased items, category of each purchased item, manufacturer, taxes paid, product identifier code that is scannable or computer readable or combinations thereof;
  (c) analyzing and relating the non-physical sales receipt and purchase related information, received at the user computing device corresponding to the electronic communication address of the user, to one or more account details and one or more account numbers relating to the purchase and the user, identified based on configurable parameters, and storing in the user computing device the non-physical sales receipt and the purchase related information based on the one or more account details and the one or more account numbers that have been identified automatically electronically in the database of the computing and/or cloud system;
  (d) analyzing and updating accounting and/or bookkeeping records, wherein the account details are a part of a bookkeeping module of the computing and/or cloud system that receives and stores the non-physical sales receipt and the purchase related information used for analyzing and updating accounting and/or bookkeeping records; and
  (e) pushing an updated user profile and/or account to the user computing device that mirrors a user profile maintained on the database, enabling instant access by the user computing device to the updated user profile account.

59. The method according to claim 58, wherein analysis of the non-physical sales receipt and the purchase related information comprises generating and storing an expiry date of a product warranty based on one or more of date, national or regional laws of a location of POS, warranty information regarding a specific seller, warranty information regarding a specific product or product type, or warranty information regarding a specific manufacturer name.

60. The method according to claim 58, wherein analyzing and updating of the accounting and/or bookkeeping records in real time, or any other time interval, and/or when the user computing device is connected to a wireless network, relating to spending and budget based on user configured parameters, cause the bookkeeping and/or accounting module to generate a warning message based on user configured parameters and send this message to the user computing device.

61. The method according to claim 58, wherein an accounting system is one or more of an accounting module and/or system, a bookkeeping module and/or system, or an Enterprise Resource Planning system (an ERP system).

62. The method according to claim 61, wherein the bookkeeping module is responsible for identifying, analyzing, and reporting, transaction data, wherein the bookkeeping module is part of a software program and responsible for recording financial transactions and automatically analyzing and updating accounting and/or bookkeeping records in real time, or any other time interval, and/or when the user computing device is connected to a wireless network.

63. The method according to claim 62, wherein the bookkeeping module is mapped to and synchronized with other external systems and/or modules, which comprise of one or more an accounting module and/or system, a bookkeeping module and/or system, or an Enterprise Resource Planning system (an ERP system).

64. The method according to claim 58, wherein both handling and storing information relating to the non-physical sales receipt comprise the use of Artificial Intelligence (AI) to make educated suggestions or make decisions regarding how sales receipts are handled, stored and utilized.

65. The method according to claim 58, wherein AI is used to determine or recommend when a warranty is stored.

66. The method according to claim 58, wherein updating the accounting and/or bookkeeping records of the account system occurs in real time, or any other time interval, and/or when the user computing device is connected to a wireless network.

67. The method according to claim 58, wherein a unique user identification parameter is electronic and/or digital, and comprises one or more of credit/debit card number, phone number, bank account number, another payment method which uniquely identifies the user, near-field communication (NFC technology), machine readable code, Bluetooth, email, or technology that enables the POS to uniquely identify a user.

68. The method according to claim 58, wherein one or more configurable parameters enables identifying one or more pre-defined account details and one or more pre-defined account numbers for certain values of a purchase related information, wherein the configurable parameters are one or more of be pre-defined and/or defined manually by the user or other user, AI based suggestions, which based on user input enables machine learning, and hence enable AI to make more accurate suggestions and/or decisions, defined automatically by AI or combinations thereof;

wherein a parameter of the purchase related information is compared with a list of configurable parameters to one or more pre-defined account details and one or more pre-defined account numbers for certain values of the purchase related information, and when the purchase related parameter exists on the list of configurable parameters pre-defined in a user profile, the non-physical sales receipt and the related information are allocated to the one or more account details and one or more account numbers specified for the configurable parameter.

69. The method according to claim 58, wherein the user computing device comprises of one or more of a desktop computer, a laptop computer, a smartphone, a smart device and a tablet, which grants the user indirect and/or direct access to a software program in the form of a web-based application that is accessed through installing an application on the user computing device or through a browser, wherein:

the user computing device receives, at the communication address of the user, the non-physical sales receipt and the purchase related information generated and sent by the POS computing device;

the user computing device enables the user to receive a purchase notification corresponding to the non-physical sales receipt and the purchase related information;

the user computing device enables the user to approve or reject the purchase based on the non-physical sales receipt, the purchase related information, and the configured parameters; and the user computing device then manually and/or automatically synchronizes with the database or processor of the computing and/or cloud system, where the software program is executed, and synchronization occurs in real-time, or any other time interval, and/or when the user computing device is connected to a wireless network, updating accounting and/or bookkeeping records.

70. The method according to claim 69, wherein after a non-physical sales receipt and the purchase related information are received, which does not include certain wanted purchase related information, the user computing device extracts the wanted purchase related information, or the user directly enters the wanted purchase related information manually by key entry on a front end of the user computing device, local scanning or data entry using the user computing device, the non-physical sales receipt and the purchase related information comprising the wanted purchase related information are then automatically stored in one or more account details and one or more account numbers related to said non-physical sales receipt.

71. The method according to claim 69, wherein the accounting and/or bookkeeping system sends a message based on user configured parameters to the user computing device, whereby the user instantly accesses a user profile and account to check the accounting records via the user computing device that mirrors a user profile maintained on the account system and/or the database.

72. The method according to claim 58, wherein the database is cloud-based or situated on an onsite processor.

73. The method according to claim 58, wherein the system processes and reads non-physical sales receipts and purchase related information.

74. The method according to claim 58, wherein a warning message being generated and sent to the user computing device, comprises a purchase notification, which comprises a fraud notification, whereby the configured parameters comprise one or more of a transaction amount, frequency/occurrence of payment, date and time, location, name of POS, payment type, and unique payment ID.

75. The method according to claim 58, wherein a user accepts or declines a POS request to use data of a user and contact a user.

76. The method according to claim 58, wherein a user accepts or declines a system request to use data of a user and contact a user.

\* \* \* \* \*